United States Patent
Sanada

(10) Patent No.: US 9,142,837 B2
(45) Date of Patent: Sep. 22, 2015

(54) LITHIUM ION SECONDARY BATTERY AND PREPARATION PROCESS OF SAME

(75) Inventor: Masakazu Sanada, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 345 days.

(21) Appl. No.: 13/590,717

(22) Filed: Aug. 21, 2012

(65) Prior Publication Data

US 2013/0065119 A1    Mar. 14, 2013

(30) Foreign Application Priority Data

Sep. 9, 2011 (JP) .................................. 2011-196770
Sep. 9, 2011 (JP) .................................. 2011-196771

(51) Int. Cl.
H01M 4/02 (2006.01)
H01M 4/64 (2006.01)
H01M 10/04 (2006.01)

(52) U.S. Cl.
CPC *H01M 4/64* (2013.01); *H01M 4/02* (2013.01); *H01M 10/0436* (2013.01); *H01M 2004/021* (2013.01); *Y10T 29/49108* (2015.01)

(58) Field of Classification Search
CPC ........................ H01M 4/02; H01M 2004/021
USPC .................................................. 429/122–347
See application file for complete search history.

(56) References Cited

U.S. PATENT DOCUMENTS 5,981,107 A * 11/1999 Hamano et al. .......... 429/231.95
2008/0083626 A1   4/2008 Kubo et al.

2011/0070479 A1   3/2011 Matsuda et al. .............. 429/162
2011/0171540 A1   7/2011 Hasegawa et al.

FOREIGN PATENT DOCUMENTS

| CN | 102035015 | 4/2011 |
|---|---|---|
| CN | 102138246 | 7/2011 |
| JP | H08-007882 | 1/1996 |
| JP | 2005-285607 | 10/2005 |
| JP | 2007-141622 | 6/2007 |

(Continued)

OTHER PUBLICATIONS

Office Action issued by Korean Patent Office on Feb. 24, 2014 in connection with corresponding Korean Patent Application No. 10-2012-0099312 with Japanese and English Translation thereof.
Office Action issued by Taiwan Patent Office on Mar. 24, 2014 in connection with corresponding Taiwan Patent Application No. 101130542 with Japanese and English Translation thereof.

(Continued)

*Primary Examiner* — Jonathan G Leong
(74) *Attorney, Agent, or Firm* — Ostrolenk Faber LLP

(57) ABSTRACT

A separator-type lithium ion secondary battery having large capacity and charge-discharge performance not destroying the separator, even with an active material layer having concavo-convex structure of high aspect ratio. The battery comprises a first electrode comprising a first current collector, and a first active material layer formed by plural convex first active material parts provided on the first current collector, a second electrode comprising a second current collector, and a second active material layer formed by plural convex second active material parts provided on the second current collector, and a separator provided between the first electrode and the second electrode, wherein the first electrode and the second electrode are integrated so that the convex first active material part is faced between the adjacent convex second active material parts, and the convex first active material part does not enter between the convex second active material parts.

5 Claims, 9 Drawing Sheets

(56) References Cited

FOREIGN PATENT DOCUMENTS

| | | |
|---|---|---|
| JP | 2007-311328 | 11/2007 |
| JP | 2008-288214 | 11/2008 |
| JP | 2009-043703 | 2/2009 |
| JP | 2009-059686 | 3/2009 |
| JP | 2010-086717 | 4/2010 |
| JP | 2011-070788 | 4/2011 |
| TW | 200831449 | 8/2008 |

OTHER PUBLICATIONS

Office Action issued by Japanese Patent Office on Dec. 16, 2014 in connection with corresponding Japanese Application No. 2011-196770 with English Translation thereof.

Office Action issued by Japanese Patent Office on Jan. 20, 2015 in connection with corresponding Japanese Application No. 2011-196771 with English Translation thereof.

Office Action issued by Korean Office on Feb. 9, 2015 in connection with corresponding Korean Application No. 10-2012-0099312.

* cited by examiner (a)

(b)

LITHIUM ION SECONDARY BATTERY AND PREPARATION PROCESS OF SAME

BACKGROUND OF THE INVENTION

1. Field of the Invention

The present invention relates to a lithium ion secondary battery and preparation process of the same.

2. Description of the Related Art

Lithium ion secondary batteries have a light weight, a large capacity and high charge-discharge performance, and thus have been widely used in fields of mobile devices such as laptop computer and cellular phone and field of automobiles. Various studies have been done for establishing larger capacity and higher charge-discharge performance.

As such a lithium ion secondary battery, there has been known, for example as disclosed in FIG. 3 of JP2008-288214 A, a separator-type battery that a positive electrode composed of a positive electrode active material layer and a metal foil and a negative electrode composed of a negative electrode active material layer and a metal foil are integrated via a separator, and the separator is immersed with an electrolyte.

On the other hand, as disclosed in JP2011-70788 A, there has also been known a all-solid lithium ion secondary battery having a construction that a positive electrode, an electrolyte and a negative electrode are integrated without a separator.

Since the rate determining factor to enlarge the capacity and to enhance the charge-discharge performance of the lithium ion secondary battery is a rate of reaction of an electrolyte with a positive electrode active material and a negative electrode active material, it is important to make a distance between the positive electrode and the negative electrode shorter, and to increase areas of the positive and negative electrodes as large as possible. Considering this viewpoint, JP2011-70788 A proposes a process for preparing an all-solid battery which includes three-dimensional electrodes containing active materials of concavo-convex structure (convex linear active material parts having a high aspect ratio).

In order to enlarge the capacity and to enhance the charge-discharge performance, if the active material layer having concavo-convex structure as proposed in JP2011-70788 A is employed in the separator-type lithium ion secondary battery shown in JP2008-288214 A, for instance, there is a risk that the convex positive electrode active material part is entered into the corresponding concaved portion between the convex negative electrode active material parts, and destroys a separator. Of course when the separator is broken, there is a risk that battery performances are lost due to short-circuit of the positive electrode active material part and the negative electrode active material part.

Namely, it was difficult that the active material layer having concavo-convex structure in the all-solid lithium ion secondary battery as proposed in JP2011-70788 A was employed in the separator-type lithium ion secondary battery shown in JP2008-288214 A.

Considering the aforementioned problems, the object of the present invention is to provide a separator-type lithium ion secondary battery having large capacity and excellent charge-discharge performance without destroying the separator, even if an active material layer having concavo-convex structure of high aspect ratio.

SUMMARY OF THE INVENTION

The present invention relates to a lithium ion secondary battery, comprising a first electrode comprising a first current collector, and a first active material layer formed by a plural of convex first active material parts which is provided on the first current collector, a second electrode comprising a second current collector, and a second active material layer formed by a plural of convex second active material parts which is provided on the second current collector, and a separator provided between the first electrode and the second electrode, wherein the first electrode and the second electrode are integrated so that the convex first active material part is faced between the adjacent convex second active material parts, and the convex first active material part does not inter between the convex second active material parts.

According to the lithium ion secondary battery having the aforementioned construction, even if an active material layer having concavo-convex structure of high aspect ratio, since the convex linear first active material part would not enter between the corresponding convex linear second active material parts and thus the separator is effectively protected from destroy, it is possible to provide a separator-type lithium ion secondary battery having large capacity and excellent charge-discharge performance.

The lithium secondary battery of the present invention has specifically, for example, the following the first embodiment and the second embodiment.

The first embodiment relates to a lithium ion secondary battery, comprising a first electrode comprising a first current collector, and a plural of convex linear first active material parts provided approximately parallel to each other on a surface of the first current collector, a second electrode comprising a second current collector, and a plural of convex linear second active material parts provided approximately parallel to each other on a surface of the second current collector, and a separator provided between the first electrode and the second electrode, wherein the first electrode and the second electrode are integrated so that the linear first active material parts and the linear second active material parts are provided in the opposed manner, and the first electrode and the second electrode are integrated in such a position that the linear first active material part crosses to the linear second active material part in the approximately vertical view to the surfaces of the first current collector and the second current collector.

According to the lithium ion secondary battery of the present invention having the aforementioned construction, even if an active material layer having concavo-convex structure of high aspect ratio, since the convex linear first active material part would not enter between the corresponding convex linear second active material parts and thus the separator is effectively protected from destroy, it is possible to provide a separator-type lithium ion secondary battery having large capacity and excellent charge-discharge performance.

In the lithium ion secondary battery of the first embodiment, it is preferable that the first electrode and the second electrode are integrated in such a position that the linear first active material part crosses to a plural of the linear second active material parts in the approximately vertical view to the surfaces of the first current collector and the second current collector.

According to the lithium ion secondary battery of the present invention having the aforementioned construction, even if an active material layer having concavo-convex structure of high aspect ratio, since the convex linear first active material part would not enter between the corresponding convex linear second active material parts, and, when pushing the laminated parts, a force applied to the separator is easily dispersed because contact sites of the linear first active material parts with the linear second active material parts are plural, and thus the separator is effectively protected from destroy, it is possible to achieve a separator-type lithium ion secondary battery having large capacity and excellent charge-discharge performance surely.

In the lithium ion secondary battery of the first embodiment, it is preferable that the first electrode and the second electrode are integrated in such a position that the linear first active material part is orthogonalized with the linear second active material part in the approximately vertical view to the surfaces of the first current collector and the second current collector.

According to the lithium ion secondary battery of the present invention having the aforementioned construction, even if an active material layer having concavo-convex structure of high aspect ratio, since the convex linear first active material part would not enter between the corresponding convex linear second active material parts, and, when pushing the laminated parts, a force applied to the separator is most effectively and easily dispersed because plural contact sites of the linear first active material parts with the linear second active material parts are maximum, and thus the separator is effectively protected from destroy, it is possible to achieve a separator-type lithium ion secondary battery having large capacity and excellent charge-discharge performance surely.

The present invention also relates to a process of manufacturing the lithium ion secondary battery of the present invention, specifically relates to a process of manufacturing a lithium ion secondary battery comprising steps of:
a first electrode forming step where a first electrode is obtained by forming a plural of convex linear first active material parts which are approximately parallel to each other on a surface of a first current collector,
a second electrode forming step where a second electrode is obtained by forming a plural of convex linear second active material parts which are approximately parallel to each other on a surface of a second current collector, and
an integrated article forming step where an integrated article is obtained by integrating the first electrode and the second electrode so that the first active material parts are faced to the second active material parts via a separator,
wherein in said integrated article forming step, the first electrode and the second electrode are integrated in such a position that the linear first active material part crosses to the linear second active material part in the approximately vertical view to the surfaces of the first current collector and the second current collector.

According to process of manufacturing the lithium ion secondary battery of the present invention having the aforementioned construction, even if an active material layer having concavo-convex structure of high aspect ratio, since the convex linear first active material part would not enter between the corresponding convex linear second active material parts and thus the separator is effectively protected from destroy, it is possible to manufacture a separator-type lithium ion secondary battery having large capacity and excellent charge-discharge performance.

In the process of manufacturing the lithium ion secondary battery of the present invention, it is preferable that in the integrated article forming step, the first electrode and the second electrode are integrated in such a position that the linear first active material part crosses to a plural of the linear second active material parts in the approximately vertical view to the surfaces of the first current collector and the second current collector.

According to process of manufacturing the lithium ion secondary battery of the present invention having the aforementioned construction, even if an active material layer having concavo-convex structure of high aspect ratio, since the convex linear first active material part would not enter between the corresponding convex linear second active material parts, and a force applied to the separator is easily dispersed because contact sites of the linear first active material parts with the linear second active material parts are plural, and thus the separator is effectively protected from destroy, it is possible to achieve a separator-type lithium ion secondary battery having large capacity and excellent charge-discharge performance surely.

In the process of manufacturing the lithium ion secondary battery of the present invention, it is preferable that in the integrated article forming step, the first electrode and the second electrode are integrated in such a position that the linear first active material part is orthogonalized with the linear second active material part in the approximately vertical view to the surfaces of the first current collector and the second current collector.

According to the lithium ion secondary battery of the present invention having the aforementioned construction, even if an active material layer having concavo-convex structure of high aspect ratio, since the convex linear first active material part would not enter between the corresponding convex linear second active material parts, and a force applied to the separator is most effectively and easily dispersed because plural contact sites of the linear first active material parts with the linear second active material parts are maximum, and thus the separator is effectively protected from destroy, it is possible to achieve a separator-type lithium ion secondary battery having large capacity and excellent charge-discharge performance surely.

The second embodiment relates to a lithium ion secondary battery, comprising
a first electrode comprising a first current collector, and a first active material layer formed by a plural of convex first active material parts which is provided on the first current collector,
a second electrode comprising a second current collector, and a second active material layer formed by a plural of convex second active material parts which is provided on the second current collector, and
a separator provided between the first electrode and the second electrode,
wherein the first electrode and the second electrode are integrated so that the convex first active material part is faced between the adjacent convex second active material parts,
a size of the convex first active material part is larger than a space between the convex second active material parts, and the convex first active material part does not inter between the convex second active material parts.

According to the lithium ion secondary battery of the present invention having the aforementioned construction, even if an active material layer having concavo-convex structure of high aspect ratio, since the convex first active material part in the first active material layer would not enter between the adjacent convex second active material parts in the corresponding second active material layer and thus the separator is effectively protected from destroy, it is possible to manufacture a separator-type lithium ion secondary battery having large capacity and excellent charge-discharge performance.

In the lithium ion secondary battery of the second embodiment, it is preferable that widths $Wa_1$ and $Wa_2$ between the two adjacent sides of the top surface of the convex first active material part, and distances $Wb_1$ and $Wb_2$ between the top surfaces (spaces) of the convex second active material parts corresponding to the above two adjacent sides satisfies $Wa_1 > Wb_1$,                            the relational inequality (1); and $Wa_2 > Wb_2$.                            the relational inequality (2):

According to the lithium ion secondary battery of the present invention having the aforementioned construction, for example, when the convex first active material part and the convex second active material part are linear or prismatic, since the convex first active material part in the first active material layer would not enter between the adjacent convex second active material parts in the corresponding second active material layer and thus the separator is effectively protected from destroy, it is possible to manufacture a separator-type lithium ion secondary battery having large capacity and excellent charge-discharge performance surely.

Accordingly, in the lithium ion secondary battery of the present invention, the convex first active material part and the convex second active material may be both linear, or the convex first active material part and the convex second active material may be both prismatic.

When linear, the lithium ion secondary battery of the present invention is constructed so that both of the convex first active material part and the convex second active material part form the pattern like line-and-space. In this case, the convex first active material part faces to the concave portion between the adjacent convex second active material parts.

According to the lithium ion secondary battery of the present invention having the aforementioned construction, since the contact area of the convex first active material part and the convex second avtice material part with the electrolyte can be enlarged, it is possible to manufacture a separator-type lithium ion secondary battery having large capacity and excellent charge-discharge performance surely.

In the lithium ion secondary battery of the second embodiment, it is preferable that the widths $Wa_1$ and $Wa_2$ of the convex first active material part are 100 to 150 μm, and the distances $Wb_1$ and $Wb_2$ between the top surfaces of the convex active material parts are 50 to 90 μm.

According to the lithium ion secondary battery of the present invention having the aforementioned construction, since the aforementioned relational inequalities are surely satisfied, and the convex first active material part in the first active material layer would not enter between the adjacent convex second active material parts in the corresponding second active material layer and thus the separator is effectively protected from destroy, it is possible to manufacture a separator-type lithium ion secondary battery having large capacity and excellent charge-discharge performance surely. Further since those heights can be achieved with respect to the widths of the convex first active material part and the convex second active material part, the active material layer having concavo-convex structure of high aspect ratio can be provided.

In the lithium ion secondary battery of the second embodiment, it is preferable that a height Ha of the convex first active material part and a height of the second active material part are both 50 to 100 μm.

According to the lithium ion secondary battery of the present invention having the aforementioned construction, electric resistances of the convex first active material part and the convex second active material part would not be increased too higher, there is a merit that lowering of the charge-discharge capacity can be prevented.

According to the present invention, it is possible to provide a separator-type lithium ion secondary battery having large capacity and excellent charge-discharge performance without destroying the separator, even if an active material layer having concavo-convex structure of high aspect ratio.

DETAILED DESCRIPTION OF THE INVENTION

In the following, embodiments according to the preparation process of the lithium ion secondary battery of the present invention are explained by referring drawings. In the following explanation, the same symbol designates the same or corresponding part, and in some cases, overlapped explanation may be omitted. With respect to the drawings, since drawing is used for explaining the concept of the present invention and for assisting understanding, there is a case that the illustrated size, ratio or number is overdrawn or simplified. In addition, in the instant description, the directions of axis X, axis Y and axis Z are defined in each figure.

First Embodiment

Figure 1:
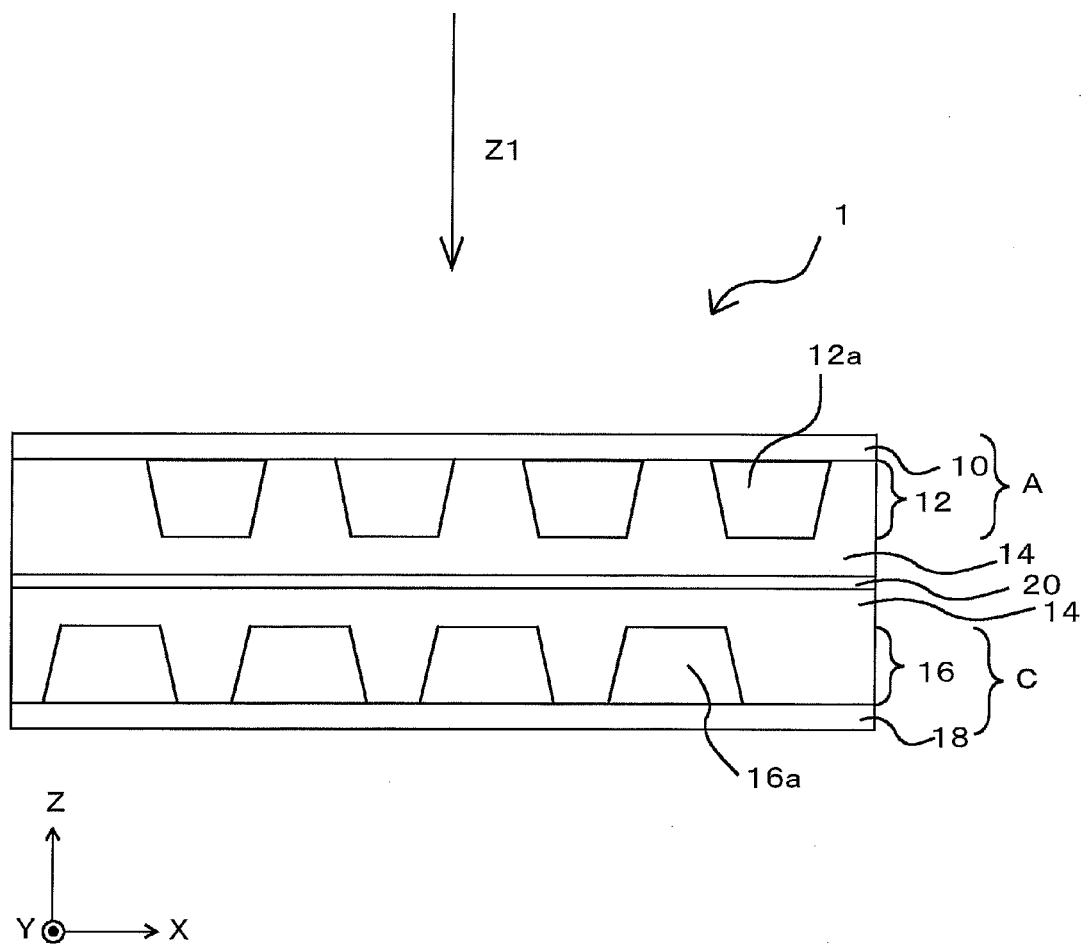
FIG. 1 is a schematic vertical sectional view showing the lithium ion secondary battery of the present invention according to the first embodiment.
Figure 2:
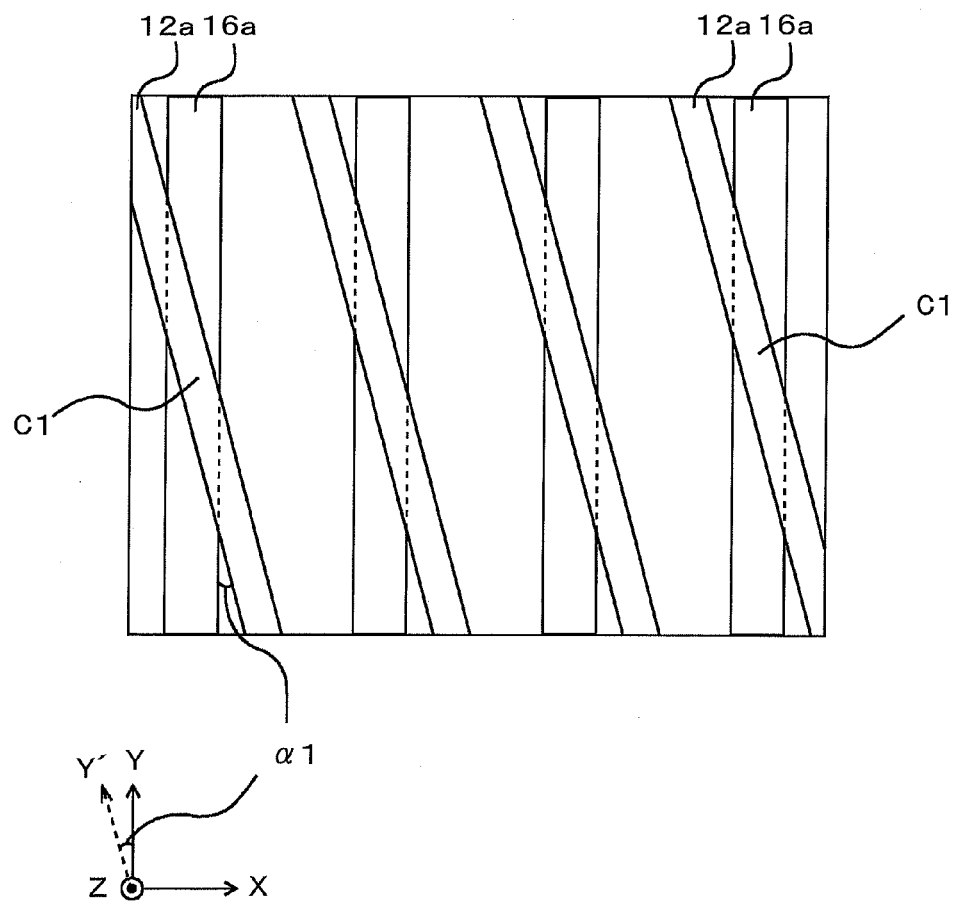
FIG. 2 is a schematic view showing the location relationship of the convex linear negative electrode active material part 12a and the convex linear positive electrode active material part 16a which is projected from the direction of arrow $Z_1$ in the lithium ion secondary battery 1 shown in FIG. 1.

In this embodiment, the present invention is explained typically according to a lithium ion secondary battery shown in FIG. 1. FIG. 1 is a schematic vertical sectional view showing the lithium ion secondary battery of the present invention according to the first embodiment. FIG. 2 is a schematic view showing the location relationship of the convex linear negative electrode active material part 12a and the convex linear positive electrode active material part 16a which is projected from the direction of arrow $Z_1$ in the lithium ion secondary battery 1 shown in FIG. 1.

Figure 3:
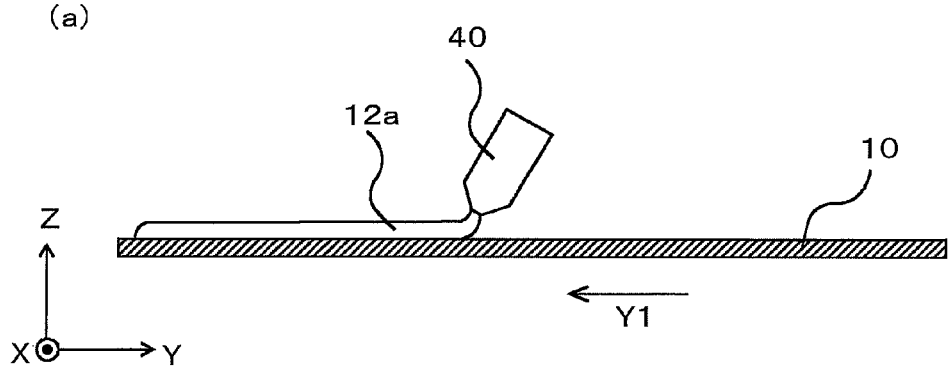
FIG. 3 is a diagrammatic view showing a manner that the linear negative electrode active material part 12a (negative electrode active material layer 12) is formed by nozzle dispense method in the lithium ion secondary battery 1 shown in FIG. 1.
Figure 3:
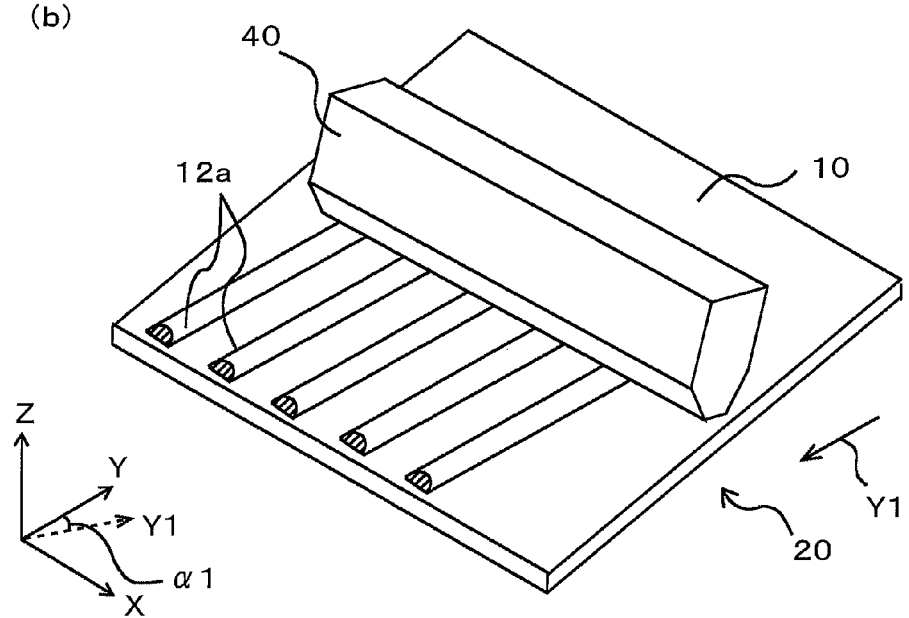
Figure 4:
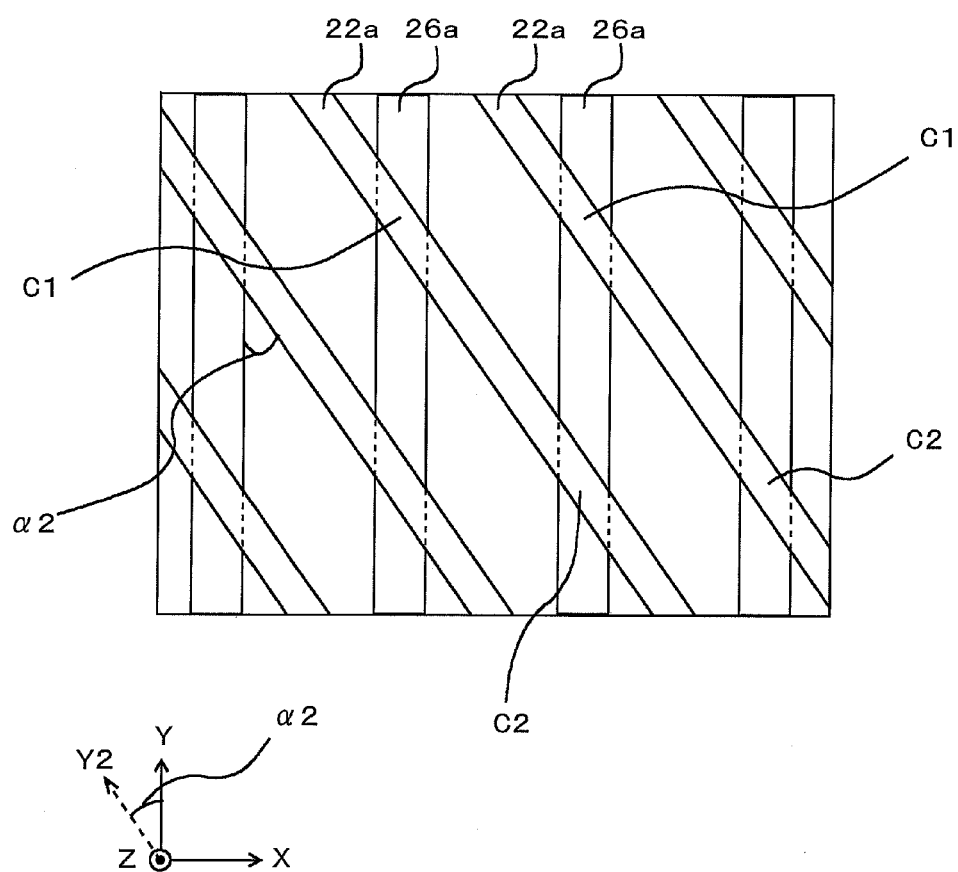
FIG. 4 is a schematic view showing the location relationship of the convex linear negative electrode active material part 22a and the convex linear positive electrode active material part 26a which is projected from the direction of arrow $Z_1$ in the first modified embodiment of the lithium ion secondary battery shown in FIG. 1 as in FIG. 2.
Figure 5:
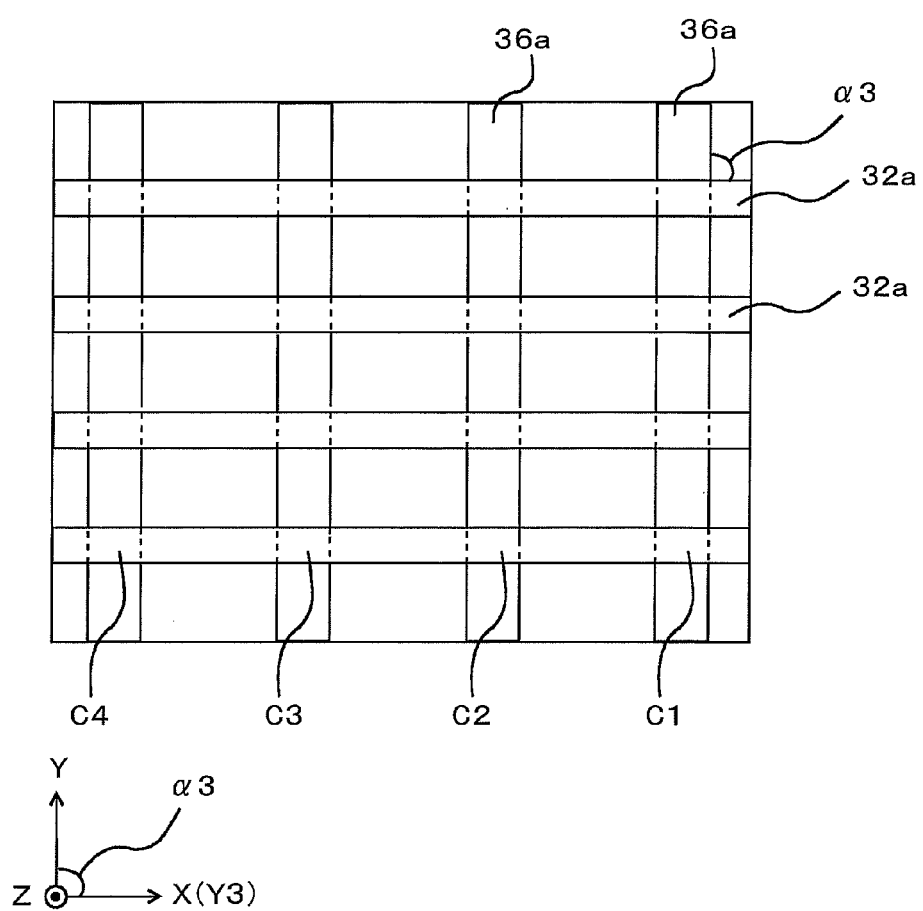
FIG. 5 is a schematic view showing the location relationship of the convex linear negative electrode active material part 32a and the convex linear positive electrode active material part 36a which is projected from the direction of arrow $Z_1$ in the second modified embodiment of the lithium ion secondary battery shown in FIG. 1 as in FIG. 2.
Figure 9:
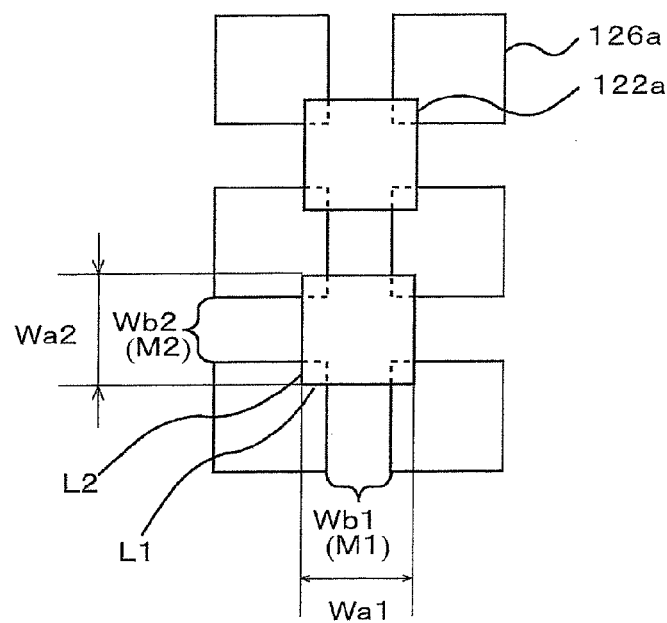
FIG. 9 is a schematic view showing the location relationship of a part of the top surface of the approximately rectangular convex negative electrode active material part 22a and the top surface of the approximately rectangular convex positive electrode active material part 26a which is projected from the direction of arrow $Z_1$ in the modified embodiment of the lithium ion secondary battery shown in FIG. 6 as in FIG. 7.

As explained in the following, FIG. 3 is a diagrammatic view showing a manner that the linear negative electrode active material part 12a (negative electrode active material layer 12) is formed by nozzle dispense method in the lithium ion secondary battery 1 shown in FIG. 1, and FIGS. 4 and 5 are schematic views showing the location relationships of the convex linear negative electrode active material part 22a, 32a and the convex linear positive electrode active material part 26a, 36a, respectively, which are projected from the direction of arrow $Z_1$ as shown in FIG. 9, in the first and second modified embodiments of the lithium ion secondary battery shown in FIG. 1 as in FIG. 2.

The lithium ion secondary battery 1 of the embodiment is composed of, as shown in FIG. 1, a negative electrode (first electrode) A, a separator 20 and a positive electrode (second electrode) C which are integrated. An electrolytic solution layer 14 is formed by charging a space between the negative electrode A and the positive electrode C with an electrolytic solution, and the separator 20 is also immersed in the electrolytic solution.

The negative electrode A is composed of an approximately rectanglar negative electrode current collector (first current collector) 10 and a negative electrode active material layer (first active material layer) 12 comprising a linear negative electrode active material part (linear first active material part) 12a. The positive electrode C is composed of an approximately rectanglar positive electrode current collector (second current collector) 18 and a positive electrode active material layer (second active material layer) 16 comprising a linear positive electrode active material part (linear second active material part) 16a. The negative electrode current collector 10 and the positive current collector 18 is integrated so that the linear negative electrode active material part 12a faces to the linear positive electrode active material part 16a.

As shown in FIG. 2, on the surface of the negative electrode current collector 10 of the negative electrode A, the negative electrode active material layer 12 is composed of a plural of convex linear negative electrode active material pars 12a which are arranged approximately parallel to each other with a space, on the surface of the positive electrode current collector 18 of the positive electrode C, the positive electrode active material layer 16 is composed of a plural of convex linear positive electrode active material pars 16a which are arranged approximately parallel to each other with a space. Namely, the linear negative electrode active material parts 12a and the linear positive electrode active material parts 16a are so formed of the line-and-space pattern.

The lithium ion secondary battery 1 according to the embodiment has a feature that when projected from the approximately vertical direction to the surfaces of the negative electrode current collector 10 and the positive electrode current collector 18 (that is, the direction of arrow $Z_1$), the linear negative electrode active material part 12a is crossed with the linear positive electrode active material part 16a at an angle of al at the point of the part $C_1$.

Namely, on the negative electrode current collector 10, a plural of the convex linear negative electrode active material parts 12a which compose the negative electrode active material layer 12 are formed with intervals, as shown in FIG. 2, so as to run out in the direction crossed with arrow Y at an angle of $\alpha_1$ on the negative electrode current collector 10. On the positive electrode current collector 18, a plural of the convex linear positive electrode active material parts 16a which compose the negative electrode active material layer 16 are formed with intervals, as shown in FIG. 2, so as to run out in the direction of arrow Y.

According to the lithium ion secondary battery 1 of the embodiment having the aforementioned construction, even if the negative electrode active material layer 12 composed of the convex linear negative electrode active material part 12a having concavo-convex structure of high aspect ratio and the positive electrode active material layer 16 composed of the convex linear positive electrode active material part 16a having concavo-convex structure of high aspect ratio, the linear negative electrode active material part 12a would not enter between the corresponding linear positive electrode active material parts 16a, the separator 20 can easily be protected from a stress due to the integration. On the other hand, the linear positive electrode active material part 16a would not enter between the corresponding linear negative electrode active material parts 12a, the separator 20 can easily be protected from a stress due to the integration.

Therefore, according to the construction of the lithium ion secondary battery 1 of the embodiment, the separator 20 is effectively protected from destroy due to projection of the linear negative electrode active material part 12a and the linear positive electrode active material part 16a, and thus the secondary battery is excellent in large capacity and charge-discharge performance, and has an excellent reliability.

In the lithium ion secondary battery 1 of the embodiment, the width and space of the linear negative electrode active material part 12a and the linear positive electrode active material part 16a may be optionally selected in so far as the achievement and effects of the invention are not imparted, and the width may be around 100 to 150 μm, the space may be around 50 to 90 μm. In such ranges, it is easy to make the aspect ratios of the linear negative electrode active material part 12a and the linear positive electrode active material part 16a high.

In addition, the height of the linear negative electrode active material part 12a and the linear positive electrode active material part 16a may be optionally selected in so far as the achievement and effects of the invention are not imparted, and the heights thereof may be around 50 to 100 μm. In such a range, electric resistances of the linear negative electrode active material part 12a and the linear positive electrode active material part 16a would not be increased too higher, there is a merit that lowering of the charge-discharge capacity can be prevented more surely.

The negative electrode current collector 10 may be made of known materials used in this technical field and examples thereof may be metal films such as an aluminum foil. The negative electrode current collector 10 may be formed on a surface of an electrically insulating substrate (not shown). The substrate may be a flat plate of an electrically insulating material, and examples thereof include a resin, glass, or ceramics, and the like. Further, the substrate may be a flexible plate.

The negative electrode active material contained in the linear negative electrode active material part 12a may be known materials used in this technical field, and examples thereof include metals, metal fibers, carbon materials, oxides, nitrides, silicon, silicon compounds, tin, tin compounds, various metal alloys, and the like. Among them, from viewpoint of large capacity density, preferable are oxides, carbon materials, silicon, silicon compounds, tin, tin compounds, and the like. Examples of the oxides include lithium titanates represented by the formula: $Li_4Ti_5O_{12}$, and the like. Examples of the carbon materials include various natural graphite, cokes, semi-graphitized carbons, carbon fibers, spherical carbons, various artificial graphite, amorphous carbons, and the like. As the silicon compounds, there are silicon-containing alloys, silicon-containing inorganic compounds, silicon-containing organic compounds, solid solutions, and the like. Examples of the silicon compounds include silicon compounds represented by $SiO_a$ (0.05<a<1.95); silicon alloys with at least one element selected from Fe, Co, Sb, Bi, Pb, Ni, Cu, Zn, Ge, In, Sn and Ti; silicon; silicon oxides; silicon compounds or silicon alloys where a part of silicon atoms is replaced by at least one element selected from B, Mg, Ni, Ti, Mo, Co, Ca, Cr, Cu, Fe, Mn, Nb, Ta, V, W, Zn, C, N and Sn; and solid solutions thereof. Examples of the tin compounds include $SnO_b$ (0<b<2), $SnO_2$, $SnSiO_3$, $Ni_2Sn_4$, $Mg_2Sn$, and the like. The negative electrode active material may be used alone and, occasion demands, may be used in combination of two or more.

The linear negative electrode active material part 12a may contain an electrically conductive aid. The electrically conductive aid may be known materials used in this technical field, and examples thereof include graphites such as natural graphite and artificial graphite; carbon blacks such as acetylene black, Ketjen black, channel black, furnace black, lump black and thermal black; electrically conductive fibers such as carbon fibers and metal fibers; fluorinated carbons; metal powders such as aluminum; electrically conductive whiskers such as zinc oxide; electrically conductive metal oxides such as titanium oxide; electrically conductive organic compounds such as phenylene derivatives; and the like. The electrically conductive aids may be used alone and, occasion demands, may be used in combination of two or more.

The lithium ion secondary battery 1 according to the embodiment is fabricated by integrating the positive electrode C composed of the positive electrode active material layer 16 and the positive electrode current collector 18 with respect to the negative electrode A composed of the negative electrode current collector 10 and the negative electrode active material layer 12, and has the electrolytic solution layer 14 between the negative electrode A and the positive electrode C. Accordingly, the lithium ion secondary battery 1 according to the embodiment has an air-tight space between the negative electrode A and the positive electrode C, and the space is charged with the electrolytic solution to form the electrolytic solution layer 14, and the separator 20 is also immersed with the electrolytic solution.

As the separator 20, there may be used one or more of porous membranes or non-woven fabrics having excellent high discharging performance. Examples of material of the separator 20 include polyolefin resins such as polyethylene and polypropylene; polyester resins such as polyethylene terephthalate and polybutylene terephthalate; vinylidene fluoride-based resins such as poly(vinylidene fluoride), vinylidene floride-hexafluoropropylene copolymer, vinylidene fluoride-perfluoro(vinyl ether) copolymer, vinylidene fluoride-tetrafluoroethylene copolymer, vinylidene fluoride-trifluoroethylene copolymer, vinylidene fluoride-fluoroethylene copolymer, vinylidene fluoride-hexafluoroacetone copolymer, vinylidene fluoride-ethylene copolymer, vinylidene fluoride-propylene copolymer, vinylidene fluoride-torifluoropropylene copolymer, vinylidene fluoride-tetrafluoroethylene-hexafluoropropylene copolymer, vinylidene fluoride-ethylene-tetrafluoroethylene copolymer, and the like.

As the separator 20, there may be used a polymer gel composed of an electrolyte and a polymer such as acrylonitrile, ethylene oxide, propylene oxide, methyl methacrylate, vinyl acetate, vinyl pyrrolidone, or poly(vinylidene fluoride).

The electrolytic solution of the electrolytic solution layer 14 may be a conventional known electrolytic solution containing a lithium salt and an organic solvent. Examples of the lithium salt include lithium hexafluorophosphate ($LiPF_6$), lithium perchlorate ($LiClO_4$), and lithium bis(trifluoromethanesulfonyl)imido (LiTFSI), and the like. Examples of the solvent include ethylene carbonate, diethylene carbonate and methyl ethyl carbonate, and a mixture thereof.

Similar to that the negative electrode active material layer 12 composed of the convex linear negative electrode active material part 12a is provided on the negative electrode current collector 10, on the positive electrode current collector 18, the positive electrode active material layer 16 composed of the convex linear positive electrode active material part 16a is provided. Provided that, according to the lithium ion secondary battery 1 of the embodiment, as mentioned above, the linear negative electrode active material part 12a and the linear positive electrode active material 16a are provided so as to be crossed at an angle of $\alpha_1$.

The positive electrode current collector 18 may be made of known materials used in this technical field and examples thereof may be metal films such as a copper foil. The positive electrode current collector 18 may be formed on a surface of an electrically insulating substrate as of the negative electrode current collector 10. The substrate may be a flat plate of an electrically insulating material, and examples thereof include a resin, glass, or ceramics, and the like. Further, the substrate may be a flexible plate.

Examples of the linear positive electrode active material (powder) contained in the positive electrode active material part 16a include lithium-containing composite metal oxides, chalcogen compounds, manganese dioxide, and the like. The lithium-containing composite metal oxide is a metal oxide containing lithium and a transition metal, or a metal oxide where a part of the transition metals of the metal oxide is replaced with a hetero element. Examples of the hetero element include Na, Mg, Sc, Y, Mn, Fe, Co, Ni, Cu, Zn, Al, Cr, Pb, Sb, B, and the like, and preferably are Mn, Al, Co, Ni, Mg, and the like. The hetero element may be single or two or more. Among them, the lithium-containing composite metal oxide is preferably used. The lithium-containing composite metal oxide may be $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (in each chemical formula, M may be at least one selected from Na, Mg, Sc, Y, Mn, Fe, Co, Ni, Cu, Zn, Al, Cr, Pb, Sb, V and B; 0<x≤1.2, 0<y≤0.9, 2.0≤z≤2.3), $LiMeO_2$ (where Me=MxMyMz; Me and M are transition metal, x+y+z=1), and the like. Examples of the lithium-containing composite metal oxide include $LiNi_{1/3}Mn_{1/3}Co_{1/3}O_2$, $LiNi_{0.8}Co_{0.15}Al_{0.05}O_2$, and the like. Here, in the aforementioned formulae, the value x which represents a molar ratio of lithium varies with charging and discharging. Examples of the chalcogen compounds include titanium disulfide, molybdenum disulfide, and the like. The positive electrode active material may be used alone or in combination of two or more. To the positive electrode active material 16, the aforementioned electrically conductive aids explained in the negative electrode active material layer 12 may be added.

As mentioned above, the lithium ion secondary battery 1 according to the embodiment is composed of the negative electrode current collector 10, the negative electrode active material layer 12, the electrolytic solution layer 14, the positive electrode active material layer 16 and the positive electrode current collector 18.

The lithium ion secondary battery 1 may have a tab electrode (not shown), and a plural of the lithium ion secondary batteries 1 may connected in series or in parallel to provide a lithium ion secondary battery device.

The lithium ion secondary battery 1 according to the embodiment having those structures is thin and can be bent easily. Since the surface area to volume of the negative electrode active material layer 12 and the positive electrode active material layer 16 is made larger by forming the steric structure in the manner of concavo-convex profile as shown in the drawings, contact areas to each of the negative electrode active material layer 12 and the positive electrode active material layer 16 and the electrolytic solution layer 14 can be made larger, which results in high efficiency and high power. As explained, the lithium ion secondary battery 1 according to the embodiment is small and has high performance.

The process for preparing the electrode and the lithium ion secondary battery 1 according to the above embodiment is explained herein below. When fabricating the lithium ion secondary battery 1 of the embodiment, firstly in the negative electrode current collector 10, the negative electrode A having the negative electrode active material layer 12 is prepared, as shown in FIG. 3, by forming the negative electrode active material part 12a along with the direction of arrow $Y_1$ which is crossed with the direction of arrow Y of FIGS. 1 and 2 at an angle of $\alpha_1$ (First electrode forming step). In the positive electrode current collector 18, the positive electrode C having the positive electrode active material layer 16 is prepared by forming the positive electrode active material part 16a along with the direction of arrow Y of FIGS. 1 and 2 (Second electrode forming step).

Next, as shown in FIG. 1, the negative electrode A and the positive electrode C are integrated so that the linear negative electrode active material part 12a and the linear positive electrode active material part 16a are faced via the separator 20. At this time, from the direction of arrow $Z_1$ of FIG. 1, the negative electrode A and the positive electrode C are integrated so that the peripheral of the negative electrode current collector 10 is configured with the peripheral of the positive electrode current collector 18 (Integrated article forming step).

Consequently, an air-tight closed space between the negative electrode A and the positive electrode C is formed according to conventional method, for example, by using a sealant, and by charging the electrolytic solution into the space, the electrolytic solution layer 14 is formed and at the same time the separator 20 is immersed with the electrolytic solution to give the lithium ion secondary battery 1 of the embodiment.

In the first electrode forming step, the linear negative electrode active material part 12a can be prepared by (A) a coating step for forming a plural of the convex linear negative electrode active material parts 12a made of the negative electrode active material on the negative electrode current collector 10 by relatively moving a nozzle which discharges the negative electrode active material composition containing a negative electrode active material linearly with respect to the negative electrode current collector 10 (Namely, Coating step by using nozzle dispense method), and (B) a drying step for drying the linear negative electrode active material parts 12a.

In the coating step (A), as shown in (a) of FIG. 3, on the main surface (X-Y plane defined by the direction of arrow X and the direction of arrow Y) of the negative electrode current collector 10, the negative electrode current collector 10 is transported in the direction of arrow $Y_1$ which is crossed with the direction of arrow Y at an angle of $\alpha_1$. In this manner, the nozzle 40 is moved relatively to the negative electrode current collector 10. A paste-like negative electrode active material is discharged from the nozzle 40 on the surface of the negative electrode current collector 10 while transporting to form a plural of the convex linear negative electrode active material parts 12a. In this embodiment, the nozzle 40 is fixed, and thus the nozzle 40 is moved relatively with respect to the negative electrode current collector 10 by transporting the negative electrode current collector 10.

The paste-like negative electrode active material is a mixture prepared by kneading the negative electrode active material, the electrically conductive aid, a binder, a solvent, and the like in the usual manner. A viscosity of the paste-like negative electrode active material can be regulated within a range being capable of discharging from the nozzle 40, and is preferably at least approximately 10 Pa·s, and at most approximately 10000 Pa·s under a shear rate of 1 s$^{-1}$. Any of the components may be dissolved or dispersed in the solvent (including partial dissolution or dispersion).

A solid content of the negative electrode active material used in the coating step for forming the negative electrode active material layer can be regulated so as to discharge from the nozzle 40, and is a solid content smaller than a solid content at its wetting point of the mixture, for example 60% by mass.

The viscosity and solid content are varied with kinds and proportions of the negative electrode active material, electrically conductive aid, binder, solvent, and a desired size and shape, and can be regulated by a period of time of kneading when the negative electrode active material, electrically conductive aid, binder, and solvent are kneaded in the usual manner.

The binder may be known materials used in this technical field, and examples thereof include poly(vinylidene fluoride) (PVDF), polytetrafluoroethylene (PTFE), polyethylene, polypropylene, aramid resin, polyamide, polyimide, plyamideimide, polyacrylonitrile, poly(acrylic acid), poly(methyl acrylate), poly(ethyl acrylate), poly(hexyl acrylate), poly (methacrylic acid), poly(methyl methacrylate), poly(ethyl methacrylate), poly(hexyl methacrylate), poly(vinyl acetate), poly(vinyl pyrrolidone), polyether, polyethersulfone, polyhexafluoroprolylene, styrene-butadiene rubber, ethylene-propylene diene copolymer, carboxymethylcellulose, and the like. In addition, there may be used, as the binder, copolymers of monomers selected from tetrafluoroethylene, hexafluoropropylene, perfluoro(alkyl vinyl ether), vinylidene fluoride, chlorotrifluoroethylene, ethylene, propylene, pentafluoropropylene, fluoromethyl vinyl ether, acrylic acid, hexadiene, and the like. The binder may be used alone and, occasion demands, may be used in combination of two or more.

The solvent is preferably an organic solvent expecting water on order to avoid decomposition of hexafluorophosphate (LiPF$_6$) and the like which compose the electrolytic solution layer 14. The solvent may be known solvents used in this technical field, and examples thereof include dimethylformamide, dimethylacetoamide, methylformamide, N-methyl-2-pyrrolidone (NMP), dimethylamine, acetone, cyclohexane, and the like. The solvent may be used alone and, occasion demands, may be used in combination of two or more.

FIG. 3(a) is a diagrammatic side view to show the manner that the linear negative electrode active material part 12a which composes the negative electrode active material layer 12 (that is, a view in the direction X being approximately parallel to the main surface of the transporting negative electrode current collector 10) is formed by the nozzle dispense method. FIG. 3(b) is a diagrammatic perspective view to show the manner that the linear negative electrode active material part 12a which composes the negative electrode active material layer 12 is formed by the nozzle dispense method.

According to the nozzle dispense method, providing the nozzle 40 which has a plural of discharging nozzles to discharge the coating liquid of the negative electrode active material above the negative electrode current collector 10, the negative electrode current collector 10 is moved in relative to the nozzle 40 in the direction of the allow $Y_1$ at a constant speed, while discharging a given amount of the negative electrode active material. As a result, on the negative electrode current collector 10, a plural of the convex linear negative electrode active material parts 12a made of the negative electrode active material are applied and formed along with the direction of $Y_1$ in such a pattern as stripe.

When providing a plural of the discharging nozzles with the nozzle 40, a plural of the convex linear negative electrode active material parts 12a are formed in the pattern of stripe, and when continuing the transportation of the negative electrode current collector 10, the stripe-like convex linear negative electrode active material parts 12a can be formed all over the surface of the negative electrode current collector 10.

A plural of the convex linear negative electrode active material parts 12a of the negative electrode active material prepared as above are green films containing the solvent. Therefore, the negative electrode current collector 10 where the linear negative electrode active material parts 12a are provided thereon may be transported so as to pass through the downstream region with a drying means such as a blower, and may be subjected to the drying step by a dry air. Through the drying step, the negative electrode A comprising the negative electrode current collector 10, and the negative electrode active material layer 12 composed of the linear negative electrode active material parts 12a provided on the negative electrode current collector 10 can be prepared.

The drying temperature and the drying period of time in the drying step may be selected optionally. The drying temperature may be a temperature range so as to dry and fix the linear negative electrode active material part 12a temporally, and preferably within a range of 5 to 150° C., more preferably a normal temperature (23° C.) to 80° C. The period of drying in the first drying step can be controlled by regulating the transporting speed of the negative electrode current collector 10.

The formation of the positive electrode active material layer 16 on the positive electrode current collector 18 is also conducted in the same manner as in the formation of the negative electrode active material layer 12 on the negative electrode current collector 10, and then the positive electrode C may be prepared. Provided that, as mentioned above, according to the embodiment, since the linear negative electrode active material part 12a is crossed with the linear positive electrode active material part 16a at an angle of $\alpha_1$, the nozzle is moved relatively with respect to the positive electrode current collector 18 so that the nozzle is transported in the direction approximately parallel to the two facing sides of the approximately rectangular positive electrode current collector 18.

By integrating the thus prepared negative electrode A and the positive electrode C in such a manner that the negative electrode active material layer 12 and the positive electrode material layer 16 are positioned face-to-face via the air-tight space and the separator 20, and then charging the space and the separator 20 with the electrolytic solution to prepare the electrolytic solution layer 14. Thereby the lithium ion secondary battery 1 of the embodiment can be obtained.

First Modified Embodiment

In the above, there is explained one embodiment of the present invention, but the present invention is not limited to the embodiment. For example, in the aforementioned embodiment, when projecting from the direction of arrow $Z_1$ in FIG. 1, there is explained the case that one linear negative electrode active material part 12a is crossed with the linear positive electrode active material part 16a at one point, and also one linear negative electrode active material part may be crossed with the linear positive electrode active material part at a plural points.

FIG. 4 is a schematic view showing the location relationship of the linear negative electrode active material part 22a and the linear positive electrode active material part 36a which is projected from the direction of arrow $Z_1$ shown in FIG. 1 as in FIG. 2, in the lithium ion secondary battery 2 of the first modified embodiment of the lithium ion secondary battery 1 of the aforementioned embodiment.

In the second modified embodiment, on the negative electrode current collector 10, a plural of the convex linear negative electrode active material parts 22a composed of the negative electrode active material layer 12 are, as shown in FIG. 4, formed with an interval in the manner that the linear negative electrode active material parts are extended in the direction crossed with the direction of arrow Y at an angle $\alpha_2$ ($>\alpha_1$) on the negative electrode current collector 10. In the positive electrode current collector 18, a plural of the convex linear positive electrode active material parts 26a composed of the positive electrode active material layer 16 are, as shown in FIG. 4, formed with an interval in the manner that the linear positive electrode active material parts are extended in the direction of arrow Y. In this manner, one linear negative electrode active material part 22a is crossed with the linear positive electrode active material part 26a at two points, i.e. point $C_1$ and point $C_2$.

According to the lithium ion secondary battery 2 having the aforementioned construction, even if the negative electrode active material layer and the positive electrode active material layer which are composed of the linear negative electrode active material part 22a and the linear positive electrode active material part 26a, respectively and have concavo-convex structure of high aspect ratio, in the integrated manner, the convex linear negative electrode active material part 22a would not enter between the corresponding convex linear positive electrode active material parts 26a.

When pushing the laminated parts, since a force applied to the separator 20 is easily dispersed because the linear negative electrode active material parts 22a can contact with the linear positive electrode active material parts 26a at two points, i.e. the point $C_1$ and the point $C_2$, the separator 20 is effectively protected from destroy, it is possible to achieve a separator-type lithium ion secondary battery 2 having large capacity and excellent charge-discharge performance surely. The lithium ion secondary battery 2 can be fabricated in the same manner as in the lithium ion secondary battery 1.

Second Modified Embodiment

For example, in the aforementioned embodiment and the first modified embodiment, when projecting from the direction of arrow $Z_1$ in FIG. 1, there are explained, as shown in FIG. 2 and FIG. 4, respectively, the cases that one linear negative electrode active material part 12a, 22a is crossed with the linear positive electrode active material part 16a, 26a at one or two points, and also one linear negative electrode active material part may be orthogonalized with the linear positive electrode active material part at a plural points.

FIG. 5 is a schematic view showing the location relationship of the linear negative electrode active material part 32a and the linear positive electrode active material part 36a which is projected from the direction of arrow $Z_1$ shown in FIG. 1 as in FIG. 2, in the lithium ion secondary battery 3 of the second modified embodiment of the lithium ion secondary battery 1 of the aforementioned embodiment.

In the third modified embodiment, on the negative electrode current collector 10, a plural of the convex linear negative electrode active material parts 22a composed of the negative electrode active material layer 12 are, as shown in FIG. 5, formed with an interval in the direction of arrow X in the manner that the linear negative electrode active material parts are extended in the direction of arrow X which is crossed (approximately orthogonalized) with the direction of arrow Y at an angle $\alpha_3$ (=90°>$\alpha_2$>$\alpha_1$) on the negative electrode current collector 10. In the positive electrode current collector 18, a plural of the convex linear positive electrode active material parts 36a composed of the positive electrode active material layer 16 are, as shown in FIG. 5, formed with an interval in the manner that the linear positive electrode active material parts are extended in the direction of arrow Y. In this manner, one linear negative electrode active material part 22a is crossed with the linear positive electrode active material part 26a at two points, i.e. point $C_1$ and point $C_2$.

According to the lithium ion secondary battery 3 having the aforementioned construction, even if the negative electrode active material layer and the positive electrode active material layer which are composed of the linear negative electrode active material part 32a and the linear positive electrode active material part 36a, respectively and have concavo-convex structure of high aspect ratio, in the integrated manner, the convex linear negative electrode active material part 32a would not enter between the corresponding convex linear positive electrode active material parts 36a.

When pushing the laminated parts, since a force applied to the separator 20 is easily dispersed because the linear negative electrode active material parts 32a can contact with the linear positive electrode active material parts 36a at a plural points, i.e. the point $C_1$ and the point $C_2$, the point $C_3$, the point $C_4$ and the point $C_n$ (not shown), the separator 20 is effectively protected from destroy, it is possible to achieve a separator-type lithium ion secondary battery 3 having large capacity and excellent charge-discharge performance. In the second modified embodiment, the number of the crossing points of the linear negative electrode active material part 32a with the linear positive electrode active material part 36a is maximum. The lithium ion secondary battery 3 can be fabricated in the same manner as in the lithium ion secondary battery 1 of the embodiment.

The lithium ion secondary battery and the process thereof can be modified variously within the scope of the present invention other than the aforementioned embodiment and the modified embodiments.

For example, in the aforementioned embodiment, the negative electrode A is prepared, as shown in FIG. 3, on the approximately rectangular negative electrode current collector 10 the linear negative electrode active material part 12a along with the direction crossed with the direction of arrow Y in FIGS. 1 and 2 at an angle of $\alpha_1$, and the positive electrode C is prepared on the approximately rectangular positive electrode current collector 18 the linear positive electrode active material part 16a along with the direction of arrow Y in FIGS. 1 and 2. Next, as shown in FIG. 1, the negative electrode A and the positive electrode C are integrated so that the linear negative electrode active material part 12a and the linear positive electrode active material part 16a are faced. At this time, from the direction of arrow $Z_1$ of FIG. 1, the negative electrode A and the positive electrode C are integrated so that the peripheral of the negative electrode current collector 10 is configurated with the peripheral of the positive electrode current collector 18

Alternatively, for example, a negative electrode and a positive electrode are prepared by forming the linear negative electrode active material parts and the positive electrode active material parts on the negative electrode current collector and the positive electrode current collector in the same direction, respectively, and then the negative electrode and the positive electrode are integrated by rotating the negative electrode and the positive electrode so that the linear negative electrode active material parts are crossed with the linear positive electrode active material parts when viewing from the approximately vertical direction to the surfaces of the negative electrode current collector and the positive electrode current collector. In the case, the shapes of the negative electrode current collector and the positive electrode current collector are previously decided according to the angle to be rotated.

The size and interval of the linear negative electrode active material part and the linear positive electrode active material part of the lithium ion secondary battery of the present invention are not particularly limited to those of the aforementioned embodiment and the modified embodiments, and may be optionally adjusted.

In the aforementioned embodiment and the modified embodiments, there is explained the case that the linear negative electrode active material parts and the linear positive electrode active material parts are formed on the negative electrode current collector and the positive electrode current collector at a constant interval. However the adjacent linear negative electrode active material parts and the adjacent linear positive electrode active material parts are continued at the base portions of the linear negative electrode active material part and the linear positive electrode active material part (namely the contact portions to the negative electrode current collector and the positive electrode current collector).

In the aforementioned embodiment and the modified embodiments,
since the linear negative electrode active material parts and the linear positive electrode active material parts to have the concavo-convex structure are formed by applying according to the nozzle dispense method, various patterns can be formed in a short time. Further it is possible to employ the nozzle dispense method for forming fine patterns suitably.

The present invention is not limited to the embodiments mentioned above, any modifications can be employed if it is suitable to those steps. For example, the coating method is not limited to the aforementioned method in each step, and any other application step may be employed if it is suitable to those steps. Moreover, for example, the electrolytic solution layer in the aforementioned embodiment and the modified embodiments may be replaced with a gel electrolyte layer when using the separator. In such a case, the solid electrolyte layer may be formed by applying the electrolyte material by spin coating method or splay coating method.

Second Embodiment

Figure 6:
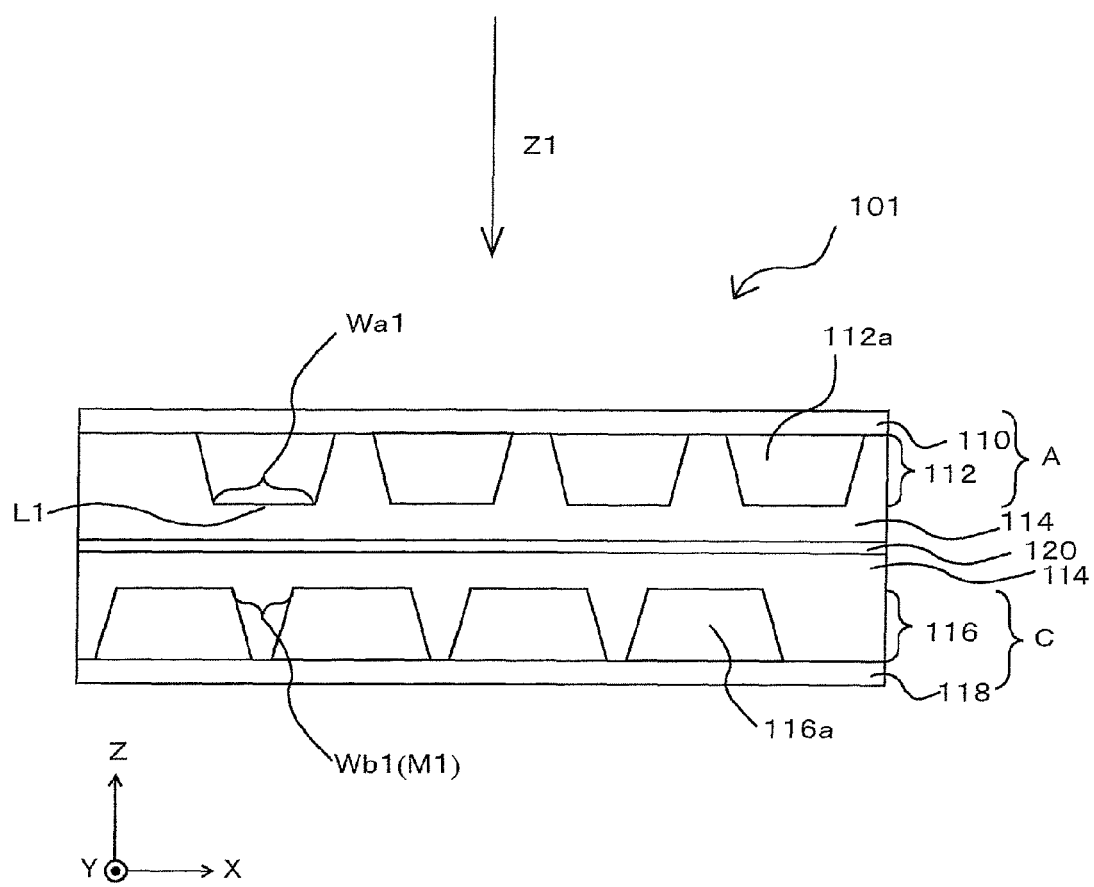
FIG. 6 is a schematic vertical sectional view showing the lithium ion secondary battery of the present invention according to the second embodiment.
Figure 7:
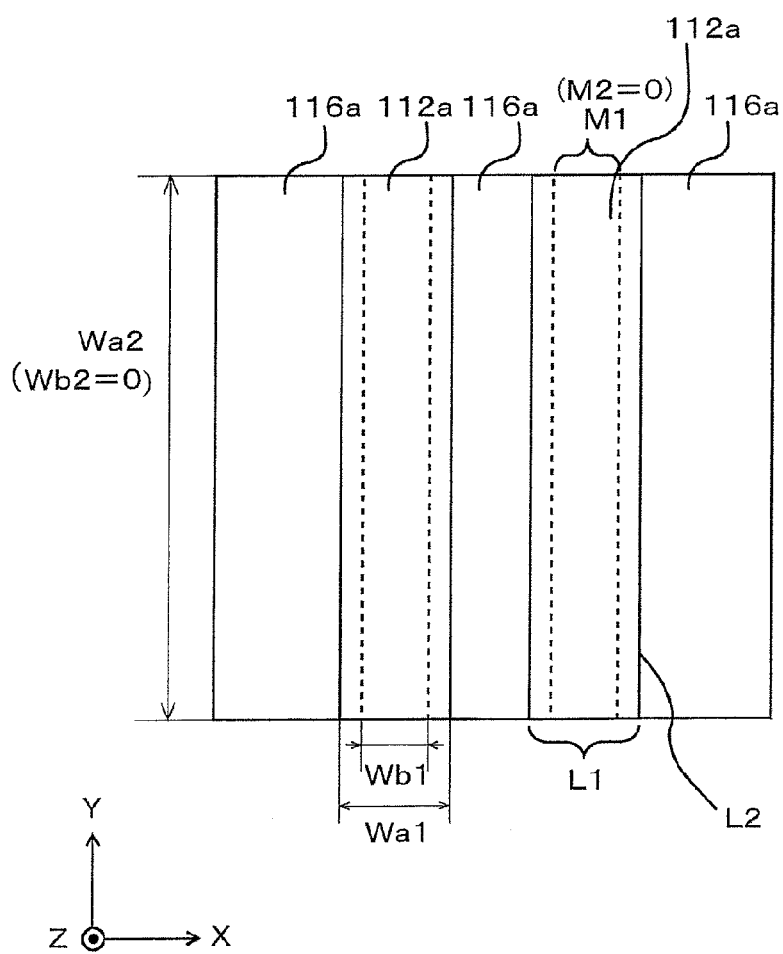
FIG. 7 is a schematic view showing the location relationship of the top surface of the linear convex negative electrode active material part 12a and the top surface end of the linear convex positive electrode active material part 16a which is projected from the direction of arrow $Z_1$ in the lithium ion secondary battery 1 shown in FIG. 6.

In this embodiment, the present invention is explained typically according to a lithium ion secondary battery shown in FIG. 6. FIG. 6 is a schematic vertical sectional view showing the lithium ion secondary battery of the present invention according to the second embodiment. FIG. 7 is a schematic view showing the location relationship of the top surface (surface) of the linear convex negative electrode active material part 112a and the top surface (surface) of the linear convex positive electrode active material part 116a which is projected from the direction of arrow $Z_1$ in the lithium ion secondary battery 101 shown in FIG. 6.

Figure 8:
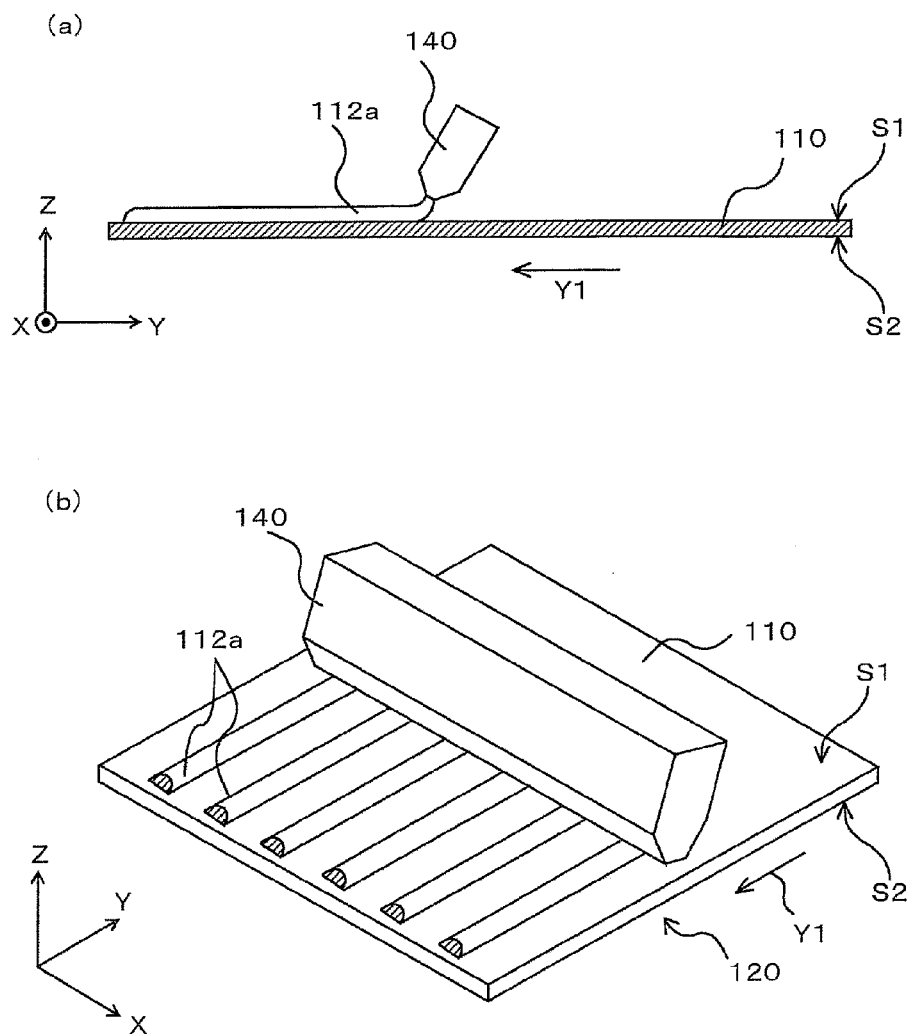
FIG. 8 is a diagrammatic view showing a manner that the linear negative electrode active material part 12a (negative electrode active material layer 12) is formed by nozzle dispense method in the lithium ion secondary battery 1 shown in FIG. 6.

As explained in the following, FIG. 8 is a diagrammatic view showing a manner that the linear negative electrode active material part 112a (negative electrode active material layer 112) is formed by nozzle dispense method in the lithium ion secondary battery 101 shown in FIG. 6. FIG. 9 is a schematic view showing the location relationship of a part of the top surface of the approximately prism convex negative electrode active material part 122a and the top surface of the approximately prism convex positive electrode active material part 126a in the modified embodiment of the lithium ion secondary battery shown in FIG. 6.

The lithium ion secondary battery 101 of the embodiment is composed of, as shown in FIG. 6, a negative electrode (first electrode) A, a separator 120 and a positive electrode (second electrode) C which are integrated. An electrolytic solution layer 114 is formed by charging a space between the negative electrode A and the positive electrode C with an electrolytic solution, and the separator 120 is also immersed in the electrolytic solution.

The negative electrode A is composed of the negative electrode current collector (first current collector) 110 and the negative electrode active material layer (first active material layer) 112 comprising a plural of linear convex negative electrode active material parts (linear first active material parts) 112a provided with a space on the negative electrode current collector 110. The positive electrode C is composed of the positive electrode current collector (second current collector) 118 and the positive electrode active material layer (second active material layer) 116 comprising a plural of the linear convex positive electrode active material parts (linear second active material parts) 116a. Namely, the linear negative electrode active material parts 112a and the linear positive electrode active material parts 116a are so formed of the line-and-space pattern.

In the lithium ion secondary battery 101 of the second embodiment, the negative electrode A and the positive electrode C are integrated, as shown in FIG. 6, so that the convex negative electrode active material part 112a faces between the adjacent convex positive electrode active material parts 116a. The most characteristic feature is, as shown in FIG. 7, that the widths (lengths) $Wa_1$ and $Wa_2$ between the two adjacent sides $L_1$ and $L_2$ of the top surface of the convex negative electrode active material part 112a, and distances $Wb_1$ and $Wb_2$ between the top surfaces (spaces) of the convex positive electrode active material parts 116a satisfies $Wa_1 > Wb_1$,           the relational inequality (1): and $Wa_2 > Wb_2$.           the relational inequality (2):

More specifically, in the lithium ion secondary battery 101 of the second embodiment, as shown in FIG. 7, the linear convex negative electrode active material part 112a has a shape of approximately rectangular or slender strip having orthogonal adjacent two sides $L_1$ and $L_2$ when projected from the direction of arrow $Z_1$ in FIG. 6. Similarly the linear convex positive electrode active material part 16a has a shape of approximately rectangular or slender strip having orthogonal adjacent two sides when projected from the direction of arrow $Z_1$ in FIG. 6.

The space $M_1$ between the top surface of the convex positive electrode active material part 116a is positioned corresponding to the side $L_1$ of the convex negative electrode active material part 112a, and the width $Wa_1$ of the side $L_1$ of the convex negative electrode active material part 112a and the distance $Wb_1$ of the space $M_1$ between the top surface of the convex positive electrode active material part 116a satisfy the relational inequality (1): $Wa_1 > Wb_1$.

In addition, the space $M_2$ between the top surface of the convex positive electrode active material part 116a is not provided corresponding to the side $L_2$ of the convex negative electrode active material part 112a, namely the distance $Wb_2$ of the space $M_2$ between the top surface of the convex positive electrode active material part 116a is 0, and the width $Wa_2$ of the side $L_2$ of the convex negative electrode active material part 112a and the distance $Wb_2$ ($=0$) of the space $M_2$ between the top surface of the convex positive electrode active material part 116a satisfy the relational inequality (2): $Wa_2 > Wb_2$.

According to the lithium ion secondary battery 101 of the embodiment having the aforementioned construction, even if the convex negative electrode active material part 112a and the convex positive electrode active material part 116a of high aspect ratio, the convex negative electrode active material part 112a would not enter between the adjacent convex positive electrode active material parts 116a, the separator 120 can be effectively protected from destroy due to projection of the convex negative electrode active material part 112a and the convex positive electrode active material part 116a, and thus the obtained separator-type lithium ion secondary battery 101 is excellent in large capacity and charge-discharge performance, and has an excellent reliability.

In the lithium ion secondary battery 101 of the embodiment, it is preferable that the width $Wa_1$ of the convex negative electrode active material part 112a is 100 to 150 μm and the distance (space) $Wb_1$ between the top surfaces of convex positive electrode active material parts 116a is 50 to 90 μm. In such ranges, the lithium ion secondary battery 101 of the embodiment can satisfy the relational inequality (1) surely, and the heights of the convex negative electrode active material part 112a and the convex positive electrode active material part 116a can be kept with respect to the widths thereof, which can achieve the high aspect ratio more surely.

In the lithium ion secondary battery 101 of the embodiment, it is preferable that the height Ha of the convex negative electrode active material part 112a and the height Hb of the convex positive electrode active material part 116a are both 50 to 100 μm. In such a range, electric resistances of the convex negative electrode active material part 112a and the convex positive electrode active material part 116a would not be increased too higher, there is a merit that lowering of the charge-discharge capacity can be prevented more surely.

The negative electrode current collector 110 may be made of known materials used in this technical field as explained in the first embodiment and examples thereof may be metal films such as an aluminum foil. The negative electrode current collector 110 may be formed on a surface of an electrically insulating substrate (not shown). The substrate may be a flat plate of an electrically insulating material, and examples thereof include a resin, glass, or ceramics, and the like. Further, the substrate may be a flexible plate.

The negative electrode active material layer 112 is, as shown in FIGS. 6 to 8, composed of a plural of the linear convex negative electrode active material parts 112a which are extended in the direction of arrow Y with an interval on the negative electrode current collector 110

The negative electrode active material contained in the convex negative electrode active material part 112a may be known materials used in this technical field as explained in the first embodiment, and examples thereof include metals, metal fibers, carbon materials, oxides, nitrides, silicon, silicon compounds, tin, tin compounds, various metal alloys, and the like. Among them, from viewpoint of large capacity density, preferable are oxides, carbon materials, silicon, silicon compounds, tin, tin compounds, and the like. Examples of the oxides include lithium titanates represented by the formula: $Li_4Ti_5O_{12}$, and the like. Examples of the carbon materials include various natural graphite, cokes, semi-graphitized carbons, carbon fibers, spherical carbons, various artificial graphite, amorphous carbons, and the like. As the silicon compounds, there are silicon-containing alloys, silicon-containing inorganic compounds, silicon-containing organic compounds, solid solutions, and the like. Examples of the silicon compounds include silicon compounds represented by $SiO_a$ (0.05<a<1.95); silicon alloys with at least one element selected from Fe, Co, Sb, Bi, Pb, Ni, Cu, Zn, Ge, In, Sn and Ti; silicon; silicon oxides; silicon compounds or silicon alloys where a part of silicon atoms is replaced by at least one element selected from B, Mg, Ni, Ti, Mo, Co, Ca, Cr, Cu, Fe, Mn, Nb, Ta, V, W, Zn, C, N and Sn; and solid solutions thereof. Examples of the tin compounds include $SnO_b$ (0<b<2), $SnO_2$, $SnSiO_3$, $Ni_2Sn_4$, $Mg_2Sn$, and the like. The negative electrode active material may be used alone and, occasion demands, may be used in combination of two or more.

The convex negative electrode active material part 112a may contain an electrically conductive aid as explained in the first embodiment. The electrically conductive aid may be known materials used in this technical field, and examples thereof include graphites such as natural graphite and artificial graphite; carbon blacks such as acetylene black, Ketjen black, channel black, furnace black, lump black and thermal black; electrically conductive fibers such as carbon fibers and metal fibers; fluorinated carbons; metal powders such as aluminum; electrically conductive whiskers such as zinc oxide; electrically conductive metal oxides such as titanium oxide; electrically conductive organic compounds such as phenylene derivatives; and the like. The electrically conductive aids may be used alone and, occasion demands, may be used in combination of two or more.

The lithium ion secondary battery 101 according to the embodiment is fabricated by integrating the positive electrode C composed of the positive electrode active material layer 116 and the positive electrode current collector 118 with respect to the negative electrode A composed of the negative electrode current collector 110 and the negative electrode active material layer 112, and has the electrolytic solution layer 114 and the separator 120 between the negative electrode A and the positive electrode C. Accordingly, the lithium ion secondary battery 101 according to the embodiment has an air-tight space between the negative electrode A and the positive electrode C, and the space is charged with the electrolytic solution to form the electrolytic solution layer 114.

As the separator 120, there may be used one or more of porous membranes or non-woven fabrics having excellent high discharging performance. Examples of material of the separator 120 include polyolefin resins such as polyethylene and polypropylene; polyester resins such as polyethylene terephthalate and polybutylene terephthalate; vinylidene fluoride-based resins such as poly(vinylidene fluoride), vinylidene floride-hexafluoropropylene copolymer, vinylidene fluoride-perfluoro(vinyl ether) copolymer, vinylidene fluoride-tetrafluoroethylene copolymer, vinylidene fluoride-trifluoroethylene copolymer, vinylidene fluoride-fluoroethylene copolymer, vinylidene fluoride-hexafluoroacetone copolymer, vinylidene fluoride-ethylene copolymer, vinylidene fluoride-propylene copolymer, vinylidene fluoride-torifluoropropylene copolymer, vinylidene fluoride-tetrafluoroethylene-hexafluoropropylene copolymer, vinylidene fluoride-ethylene-tetrafluoroethylene copolymer, and the like.

As the separator 120, there may be used a polymer gel composed of an electrolyte and a polymer such as acrylonitrile, ethylene oxide, propylene oxide, methyl methacrylate, vinyl acetate, vinyl pyrrolidone, or poly(vinylidene fluoride).

The electrolytic solution of the electrolytic solution layer 114 may be a conventional known electrolytic solution containing a lithium salt and an organic solvent as explained in the first embodiment. Examples of the lithium salt include lithium hexafluorophosphate ($LiPF_6$), lithium perchlorate ($LiClO_4$), and lithium bis(trifluoromethanesulfonyl)imido (LiTFSI), and the like. Examples of the solvent include ethylene carbonate, diethylene carbonate and methyl ethyl carbonate, and a mixture thereof.

Similar to that the negative electrode active material layer 112 composed of the convex negative electrode active material part 112a is provided on the negative electrode current collector 110, on the positive electrode current collector 118, the positive electrode active material layer 116 composed of the convex positive electrode active material part 116a is provided.

The positive electrode current collector 118 may be made of known materials used in this technical field as explained in the first embodiment and examples thereof may be metal films such as a copper foil. The positive electrode current collector 118 may be formed on a surface of an electrically insulating substrate as of the negative electrode current collector 110. The substrate may be a flat plate of an electrically insulating material, and examples thereof include a resin, glass, or ceramics, and the like. Further, the substrate may be a flexible plate.

Examples of the linear positive electrode active material (powder) contained in the convex positive electrode active material part 116a include, as explained in the first embodiment, lithium-containing composite metal oxides, chalcogen compounds, manganese dioxide, and the like. The lithium-containing composite metal oxide is a metal oxide containing lithium and a transition metal, or a metal oxide where a part of the transition metals of the metal oxide is replaced with a hetero element. Examples of the hetero element include Na, Mg, Sc, Y, Mn, Fe, Co, Ni, Cu, Zn, Al, Cr, Pb, Sb, B, and the like, and preferably are Mn, Al, Co, Ni, Mg, and the like. The hetero element may be single or two or more. Among them, the lithium-containing composite metal oxide is preferably used. The lithium-containing composite metal oxide may be $Li_xCoO_2$, $Li_xNiO_2$, $Li_xMnO_2$, $Li_xCo_yNi_{1-y}O_2$, $Li_xCo_yM_{1-y}O_x$, $Li_xNi_{1-y}M_yO_z$, $Li_xMn_2O_4$, $Li_xMn_{2-y}M_yO_4$, $LiMPO_4$, $Li_2MPO_4F$ (in each chemical formula, M may be at least one selected from Na, Mg, Sc, Y, Mn, Fe, Co, Ni, Cu, Zn, Al, Cr, Pb, Sb, V and B; 0<x≤1.2, 0<y≤0.9, 2.0≤z≤2.3), $LiMeO_2$ (where Me=MxMyMz; Me and M are transition metal, x+y+z=1), and the like. Examples of the lithium-containing composite metal oxide include $LiNi_{1/3}Mn_{1/3}CO_{1/3}O_2$, $LiNi_{0.8}Co_{0.15}Al_{0.05}O_2$, and the like. Here, in the aforementioned formulae, the value x which represents a molar ratio of lithium varies with charging and discharging. Examples of the chalcogen compounds include titanium disulfide, molybdenum disulfide, and the like. The positive electrode active material may be used alone or in combination of two or more.

To the positive electrode active material 16, the aforementioned electrically conductive aids explained in the negative electrode active material layer 12 may be added.

As mentioned above, the lithium ion secondary battery 101 according to the embodiment is composed of the negative electrode current collector 110, the negative electrode active material layer 112, the separator 120, the electrolytic solution layer 114, the positive electrode active material layer 116 and the positive electrode current collector 118.

The lithium ion secondary battery 101 may have a tab electrode (not shown), and a plural of the lithium ion secondary batteries 101 may connected in series or in parallel to provide a lithium ion secondary battery device.

The lithium ion secondary battery 101 according to the embodiment having those structures is thin and can be bent easily. Since the surface area to volume of the negative electrode active material layer 112 and the positive electrode active material layer 116 is made larger by forming the steric structure in the manner of concavo-convex profile as shown in the drawings, contact areas to each of the negative electrode active material layer 112 and the positive electrode active material layer 116 and the electrolytic solution layer 114 can be made larger, which results in high efficiency and high power. As explained, the lithium ion secondary battery 1 according to the embodiment is small and has high performance.

The process for preparing the electrode and the lithium ion secondary battery 101 according to the above embodiment is explained herein below. When fabricating the lithium ion secondary battery 101 of the second embodiment, firstly the negative electrode A is prepared by forming the negative electrode active material layer 112 composed of the convex negative electrode active material part 112a on the negative electrode current collector 110, and the positive electrode C is prepared by forming the positive electrode active material layer 16 composed of the convex positive electrode active material part 116a on the negative electrode current collector 118.

Next, as shown in FIG. 6, the negative electrode A and the positive electrode C are integrated so that, in the positive electrode active material layer 116 the convex negative electrode active material part 112a faces between the adjacent convex positive electrode active material parts 116a via the separator 120. An air-tight closed space between the negative electrode A and the positive electrode C is formed according to conventional method, for example, by using a sealant, and by charging the electrolytic solution into the space, the electrolytic solution layer 114 is formed and at the same time the separator 120 is immersed with the electrolytic solution.

The convex negative electrode active material part 112a can be prepared by (A) a coating step for forming a plural of the convex negative electrode active material parts 112a made of the negative electrode active material on the negative electrode current collector 110 by relatively moving a nozzle which discharges the negative electrode active material composition containing a negative electrode active material linearly with respect to the negative electrode current collector 110 (Namely, Coating step by using nozzle dispense method), and (B) a drying step for drying the convex negative electrode active material parts 112a.

In the coating step (A), as shown in (a) of FIG. 8, the negative electrode current collector 110 is transported in the direction of arrow $Y_1$. In this manner, the nozzle 140 is moved relatively to the negative electrode current collector 110. A paste-like negative electrode active material is discharged from the nozzle 140 on the surface of the negative electrode current collector 110 while transporting to form a plural of the convex negative electrode active material parts 112a. In this embodiment, the nozzle 140 is fixed, and thus the nozzle 140 is moved relatively with respect to the negative electrode current collector 110 by transporting the negative electrode current collector 110.

The paste-like negative electrode active material is a mixture prepared by kneading the negative electrode active material, the electrically conductive aid, a binder, a solvent, and the like in the usual manner. A viscosity of the paste-like negative electrode active material can be regulated within a range being capable of discharging from the nozzle 140, and is preferably at least approximately 10 Pa·s, and at most approximately 10000 Pa·s under a shear rate of $1\ s^{-1}$. Any of the components may be dissolved or dispersed in the solvent (including partial dissolution or dispersion).

A solid content of the negative electrode active material used in the coating step for forming the negative electrode active material layer can be regulated so as to discharge from the nozzle 140, and is a solid content smaller than a solid content at its wetting point of the mixture, for example 60% by mass.

The viscosity and solid content are varied with kinds and proportions of the negative electrode active material, electrically conductive aid, binder, solvent, and a desired size and shape, and can be regulated by a period of time of kneading when the negative electrode active material, electrically conductive aid, binder, and solvent are kneaded in the usual manner.

The binder may be known materials used in this technical field, and examples thereof include poly(vinylidene fluoride) (PVDF), polytetrafluoroethylene (PTFE), polyethylene, polypropylene, aramid resin, polyamide, polyimide, plyamideimide, polyacrylonitrile, poly(acrylic acid), poly(methyl acrylate), poly(ethyl acrylate), poly(hexyl acrylate), poly (methacrylic acid), poly(methyl methacrylate), poly(ethyl methacrylate), poly(hexyl methacrylate), poly(vinyl acetate), poly(vinyl pyrrolidone), polyether, polyethersulfone, polyhexafluoroprolylene, styrene-butadiene rubber, ethylene-propylene diene copolymer, carboxymethylcellulose, and the like. In addition, there may be used, as the binder, copolymers of monomers selected from tetrafluoroethylene, hexafluoropropylene, perfluoro(alkyl vinyl ether), vinylidene fluoride, chlorotrifluoroethylene, ethylene, propylene, pentafluoropropylene, fluoromethyl vinyl ether, acrylic acid, hexadiene, and the like. The binder may be used alone and, occasion demands, may be used in combination of two or more.

The solvent is preferably an organic solvent expecting water on order to avoid decomposition of hexafluorophosphate ($LiPF_6$) and the like which compose the electrolytic solution layer 114. The solvent may be known solvents used in this technical field, and examples thereof include dimethylformamide, dimethylacetoamide, methylformamide, N-methyl-2-pyrrolidone (NMP), dimethylamine, acetone, cyclohexane, and the like. The solvent may be used alone and, occasion demands, may be used in combination of two or more.

FIG. 8(a) is a diagrammatic side view to show the manner that the convex negative electrode active material part 112a which composes the negative electrode active material layer 112 (that is, a view in the direction X being approximately parallel to the main surface of the transporting negative electrode current collector 110) is formed by the nozzle dispense method. FIG. 8(b) is a diagrammatic perspective view to show the manner that the convex negative electrode active material part 112a which composes the negative electrode active material layer 112 is formed by the nozzle dispense method.

According to the nozzle dispense method, providing the nozzle 140 which has a plural of discharging nozzles to discharge the coating liquid of the negative electrode active material above the negative electrode current collector 110, the negative electrode current collector 110 is moved in relative to the nozzle 140 in the direction of the allow $Y_1$ at a constant speed, while discharging a given amount of the negative electrode active material. As a result, on the negative electrode current collector 110, a plural of the convex linear negative electrode active material parts 112a made of the negative electrode active material are applied and formed along with the direction of Y in such a pattern as stripe.

When providing a plural of the discharging nozzles with the nozzle 140, a plural of the convex negative electrode active material parts 112a are formed in the pattern of stripe, and when continuing the transportation of the negative electrode current collector 110, the stripe-like convex negative electrode active material parts 112a can be formed all over the surface of the negative electrode current collector 110.

A plural of the convex negative electrode active material parts 112a of the negative electrode active material prepared as above are green films containing the solvent. Therefore, the negative electrode current collector 110 where the convex negative electrode active material parts 112a are provided thereon may be transported so as to pass through the downstream region with a drying means such as a blower, and may be subjected to the drying step by a dry air. Through the drying step, the negative electrode A comprising the negative electrode current collector 110, and the negative electrode active material layer 112 composed of the linear convex negative electrode active material parts 112a provided on the negative electrode current collector 110 can be prepared.

The drying temperature and the drying period of time in the drying step may be selected optionally. The drying temperature may be a temperature range so as to dry and fix the convex negative electrode active material part 112a temporally, and preferably within a range of 5° C. to 150° C., more preferably a normal temperature (23° C.) to 80° C. The period of drying in the first drying step can be controlled by regulating the transporting speed of the negative electrode current collector 110.

The formation of the positive electrode active material layer 116 on the positive electrode current collector 118 is also conducted in the same manner as in the formation of the negative electrode active material layer 112 on the negative electrode current collector 110. By integrating the thus prepared negative electrode A and the positive electrode C in such a manner that the negative electrode active material layer 112 and the positive electrode material layer 116 are positioned face-to-face via the air-tight space and the separator 120, and then charging the space and the separator 120 with the electrolytic solution to prepare the electrolytic solution layer 114. Thereby the lithium ion secondary battery 101 of the embodiment can be obtained.

Modified Embodiment

In the above, there is explained the second embodiment of the present invention, but the present invention is not limited to the embodiment. For example, in the second embodiment, there is explained the case that the convex negative electrode active material part 112a and the convex positive electrode active material part 116a are linear, the convex negative electrode active material part and the convex positive electrode active material part may be approximately prism.

FIG. 9 is a schematic view showing the location relationship of a part of the top surface of the approximately prism convex negative electrode active material part 122a and the top surface of the approximately prism convex positive electrode active material part 126a which is projected from the direction of arrow $Z_1$ in the modified embodiment of the lithium ion secondary battery shown in FIG. 6 as in FIG. 7.

In the embodiment, as shown in FIG. 9 and as in the aforementioned embodiment, the convex negative electrode active material part 122a faces between the adjacent convex positive electrode active material parts 126a. As shown in FIG. 9, the widths (lengths) $Wa_1$ and $Wa_1$ between the two adjacent sides $L_1$ and $L_2$ of the top surface of the convex negative electrode active material part 122a, and distances $Wb_1$ and $Wb_2$ between the top surfaces (spaces) of the convex positive electrode active material parts 126a satisfies $Wa_1 > Wb_1$,  the relational inequality (1): and $Wa_2 > Wb_2$.  the relational inequality (2):

More specifically, in the embodiment, the approximately square convex negative electrode active material part 122a has a shape of approximately square having orthogonal adjacent two sides $L_1$ and $L_2$ when projected from the direction of arrow $Z_1$ in FIG. 6 (see FIG. 9). Similarly the approximately square convex positive electrode active material part 126a has a shape of approximately square having orthogonal adjacent two sides when projected from the direction of arrow $Z_1$ in FIG. 6.

The space $M_1$ between the top surface of the convex positive electrode active material part 126a is positioned corresponding to the side $L_1$ of the convex negative electrode active material part 122a, and the width $Wa_1$ of the side $L_1$ of the convex negative electrode active material part 122a and the distance $Wb_1$ of the space $M_1$ between the top surface of the convex positive electrode active material part 126a satisfy the relational inequality (1): $Wa_1 > Wb_1$.

In addition, the space $M_2$ between the top surface of the convex positive electrode active material part 126a is positioned corresponding to the side $L_2$ of the convex negative electrode active material part 122a, and the width $Wa_2$ of the side $L_2$ of the convex negative electrode active material part 122a and the distance $Wb_2$ of the space $M_2$ between the top surface of the convex positive electrode active material part 126a satisfy the relational inequality (2): $Wa_2 > Wb_2$.

These approximately square convex negative electrode active material part 122a and approximately square convex positive electrode active material part 126a can also be prepared according to the nozzle dispense method by controlling a discharge amount and timing as in the aforementioned embodiment.

According to the lithium ion secondary battery 101 of the embodiment having the aforementioned construction, even if the convex negative electrode active material part 122a and the convex positive electrode active material part 126a of high aspect ratio, the convex negative electrode active material part 122a would not enter between the adjacent convex positive electrode active material parts 126a, the separator 120 can be effectively protected from destroy due to projection of the convex negative electrode active material part 122a and the convex positive electrode active material part 126a, and thus the obtained separator-type lithium ion secondary battery 101 is excellent in large capacity and charge-discharge performance, and has an excellent reliability.

The lithium ion secondary battery can be modified variously within the scope of the present invention other than the aforementioned embodiment and the modified embodiments.

For example, in the aforementioned embodiment and the modified embodiments, there is explained the case that since the size of the convex negative electrode active material part is larger than the space between the convex positive electrode active material parts, the convex negative electrode active material part would not enter between the convex positive electrode active material parts. In the lithium ion secondary battery of the present invention, it may be modified that the size of the convex positive electrode active material part is larger than the space between the convex negative electrode active material parts, and thus the convex positive electrode active material part would not enter between the convex negative electrode active material parts.

In the aforementioned embodiment and the modified embodiments, there is explained the case that both of the convex negative electrode active material part and the convex positive electrode active material part are linear or approximately prism. In the lithium ion secondary battery of the present invention, it may be modified that one is linear and the other is approximately prism.

In the aforementioned embodiment and the modified embodiments, there is explained the case that the convex negative electrode active material parts and the convex positive electrode active material parts are formed on the negative electrode current collector and the positive electrode current collector at a constant interval. However the adjacent convex negative electrode active material parts and the adjacent convex positive electrode active material parts are continued at the base portions of the convex negative electrode active material part and the convex positive electrode active material part (namely the contact portions to the negative electrode current collector and the positive electrode current collector).

In the aforementioned embodiment and the modified embodiments,
since the convex negative electrode active material parts and the convex positive electrode active material parts to have the concavo-convex structure are formed by applying according to the nozzle dispense method, various patterns can be formed in a short time. Further it is possible to employ the nozzle dispense method for forming fine patterns suitably.

The present invention is not limited to the embodiments mentioned above, any modifications can be employed if it is suitable to those steps. For example, the coating method is not limited to the aforementioned method in each step, and any other application step may be employed if it is suitable to those steps. Moreover, for example, the electrolytic solution layer in the aforementioned embodiment and the modified embodiments may be replaced with a gel electrolyte layer when using the separator. In such a case, the solid electrolyte layer may be formed by applying the electrolyte material by spin coating method or splay coating method.

What is claimed is:

1. A lithium ion secondary battery, comprising
a first electrode comprising a first current collector and a first active material layer formed by a plural of convex first active material parts which is provided on the first current collector,
a second electrode comprising a second current collector and a second active material layer formed by a plural of convex second active material parts which is provided on the second current collector, and
a separator provided between the first electrode and the second electrode,
wherein the first electrode and the second electrode are integrated so that the convex first active material part is faced between the adjacent convex second active material parts,
a size of the convex first active material part is larger than a space between the convex second active material parts, and the convex first active material part does not enter between the convex second active material parts, and
an electrolytic layer formed by charging a space between the first electrode and the second electrode with an electrolytic solution or gel;
wherein widths $Wa_1$ and $Wa_2$ between the two adjacent sides of the top surface of the convex first active material part, and distances $Wb_1$ and $Wb_2$ between the top surfaces (spaces) of the convex second active material parts corresponding to the above two adjacent sides satisfies $Wa_1 > Wb_1$, the relational inequality (1): and $Wa_2 > Wb_2$. the relational inequality (2):

2. The lithium ion secondary battery of claim 1, wherein the convex first active material part and the convex second active material are both linear.

3. The lithium ion secondary battery of claim 1, wherein the convex first active material part and the convex second active material are both prismatic.

4. The lithium ion secondary battery of claim 1, wherein the widths $Wa_1$ and $Wa_2$ of the convex first active material part are 100 to 150 μm and the distances $Wb_1$ and $Wb_2$ between the top surfaces of the convex second active material parts are 50 to 90 μm.

5. The lithium ion secondary battery of claim 1, wherein a height Ha of the convex first active material part and a height of the second active material part are both 50 to 100 μm.

* * * * *